P. HEIN.
MEANS FOR HEATING BRIQUETS AND THE LIKE.
APPLICATION FILED JULY 21, 1911.
1,039,533.
Patented Sept. 24, 1912.
6 SHEETS—SHEET 1.
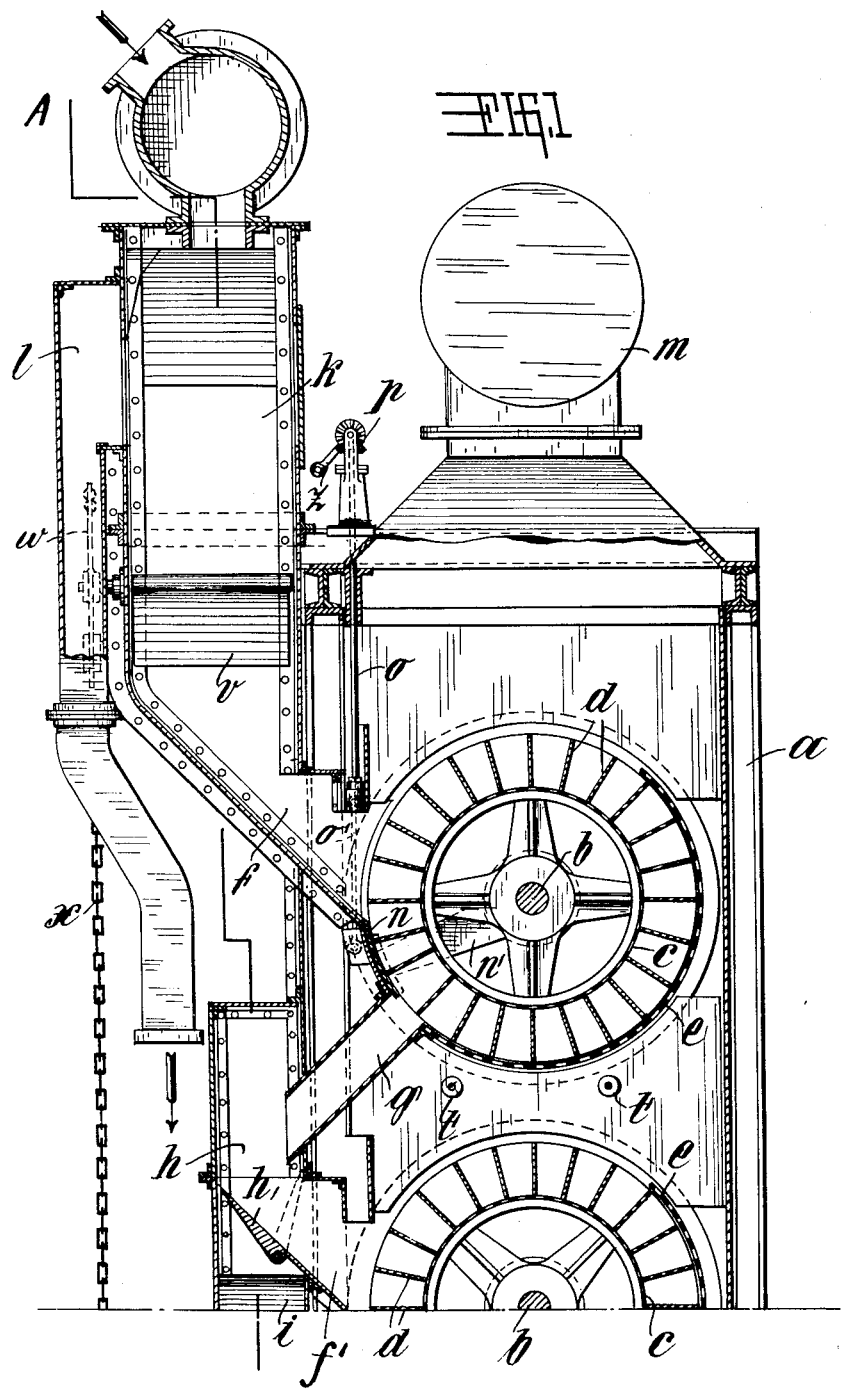

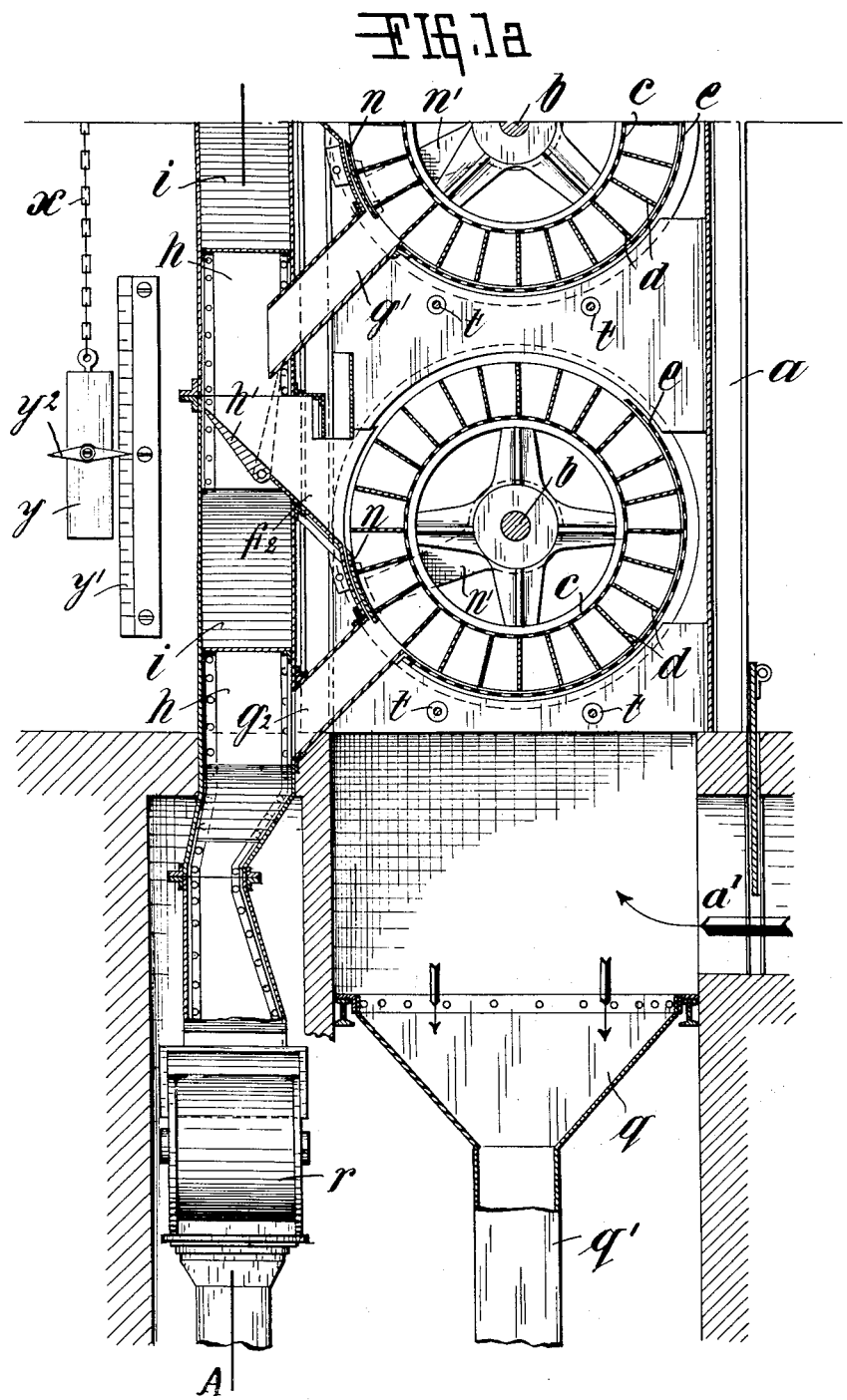

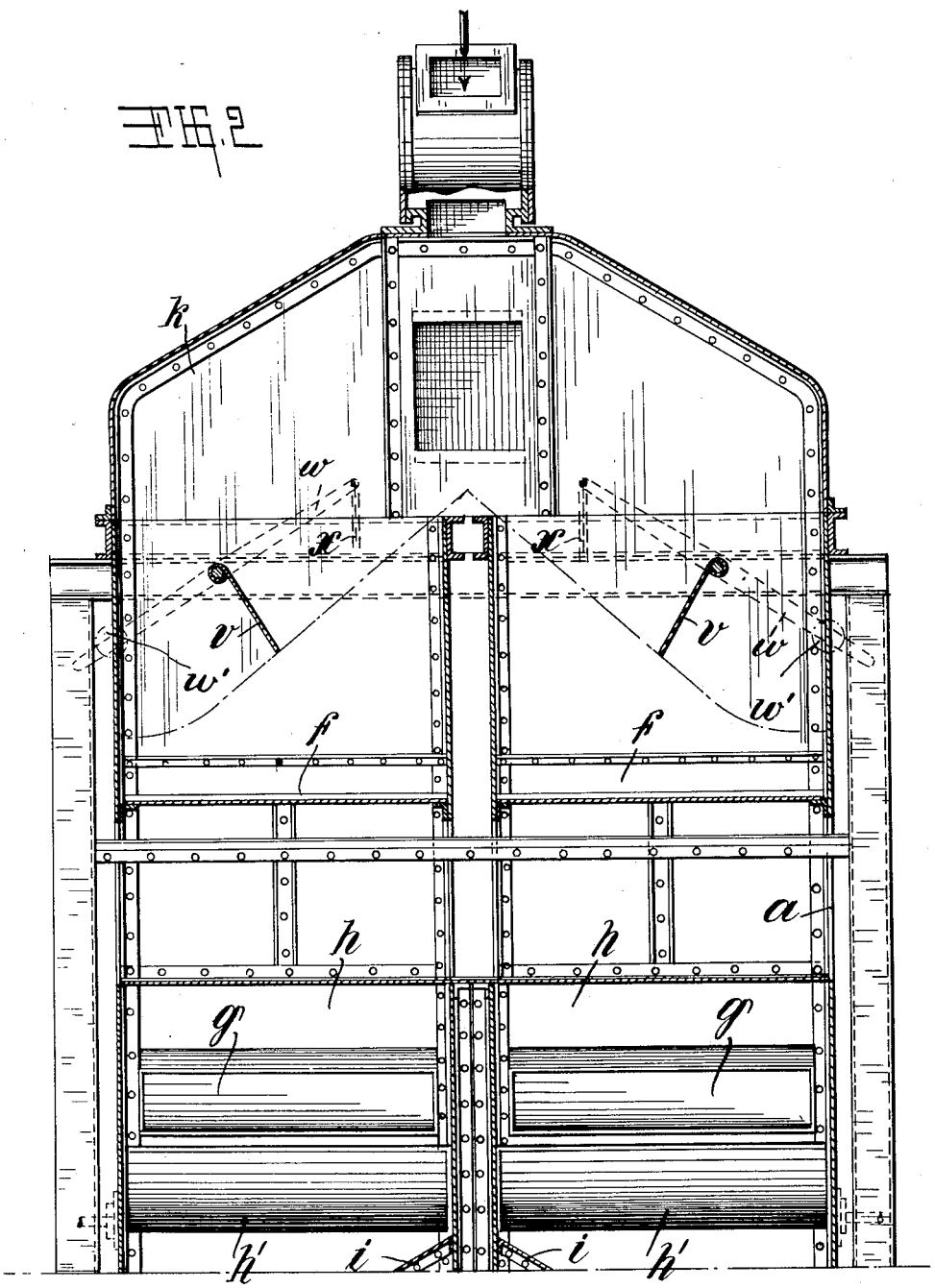

P. HEIN.
MEANS FOR HEATING BRIQUETS AND THE LIKE.
APPLICATION FILED JULY 21, 1911.
1,039,533.
Patented Sept. 24, 1912.
6 SHEETS—SHEET 4.
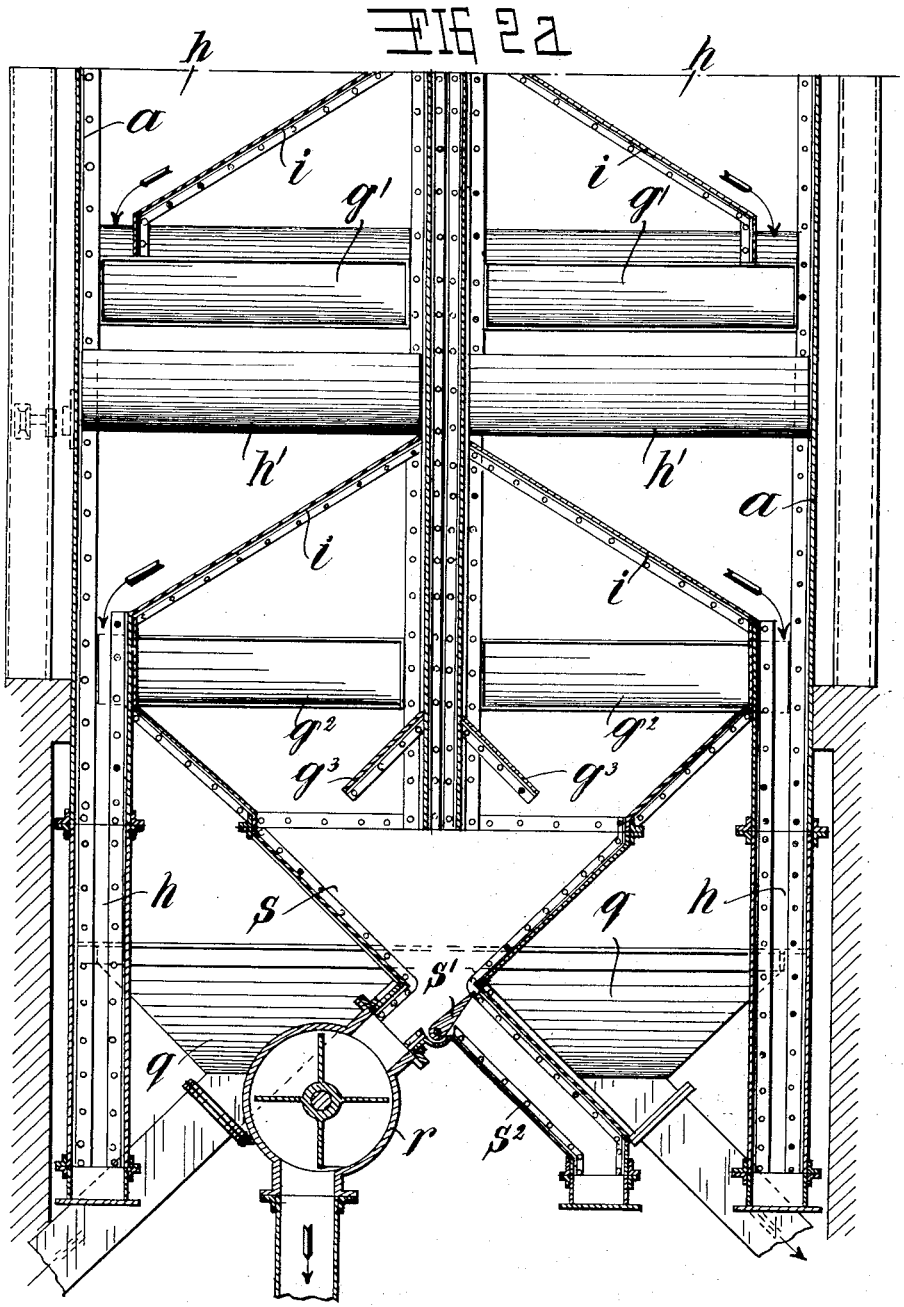

P. HEIN.
MEANS FOR HEATING BRIQUETS AND THE LIKE.
APPLICATION FILED JULY 21, 1911.
1,039,533.
Patented Sept. 24, 1912.
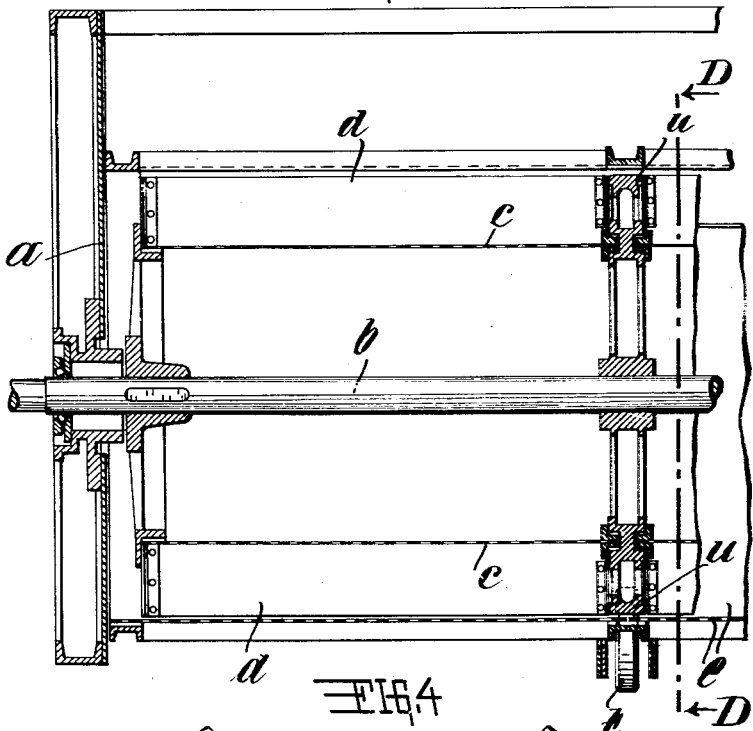
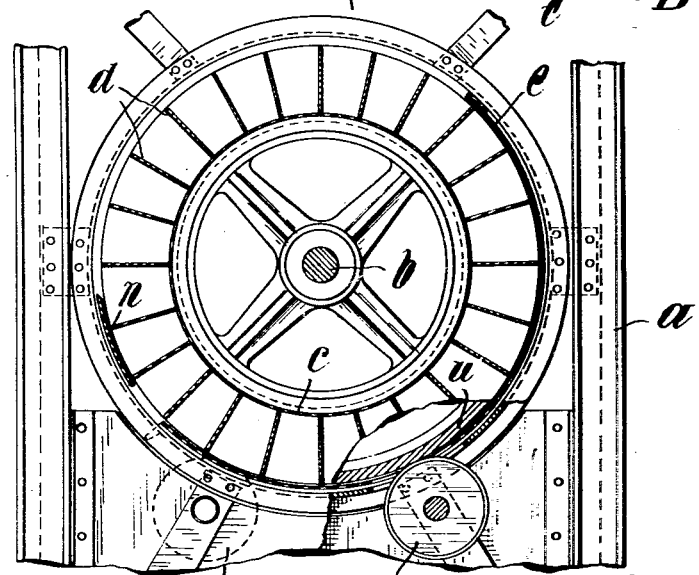

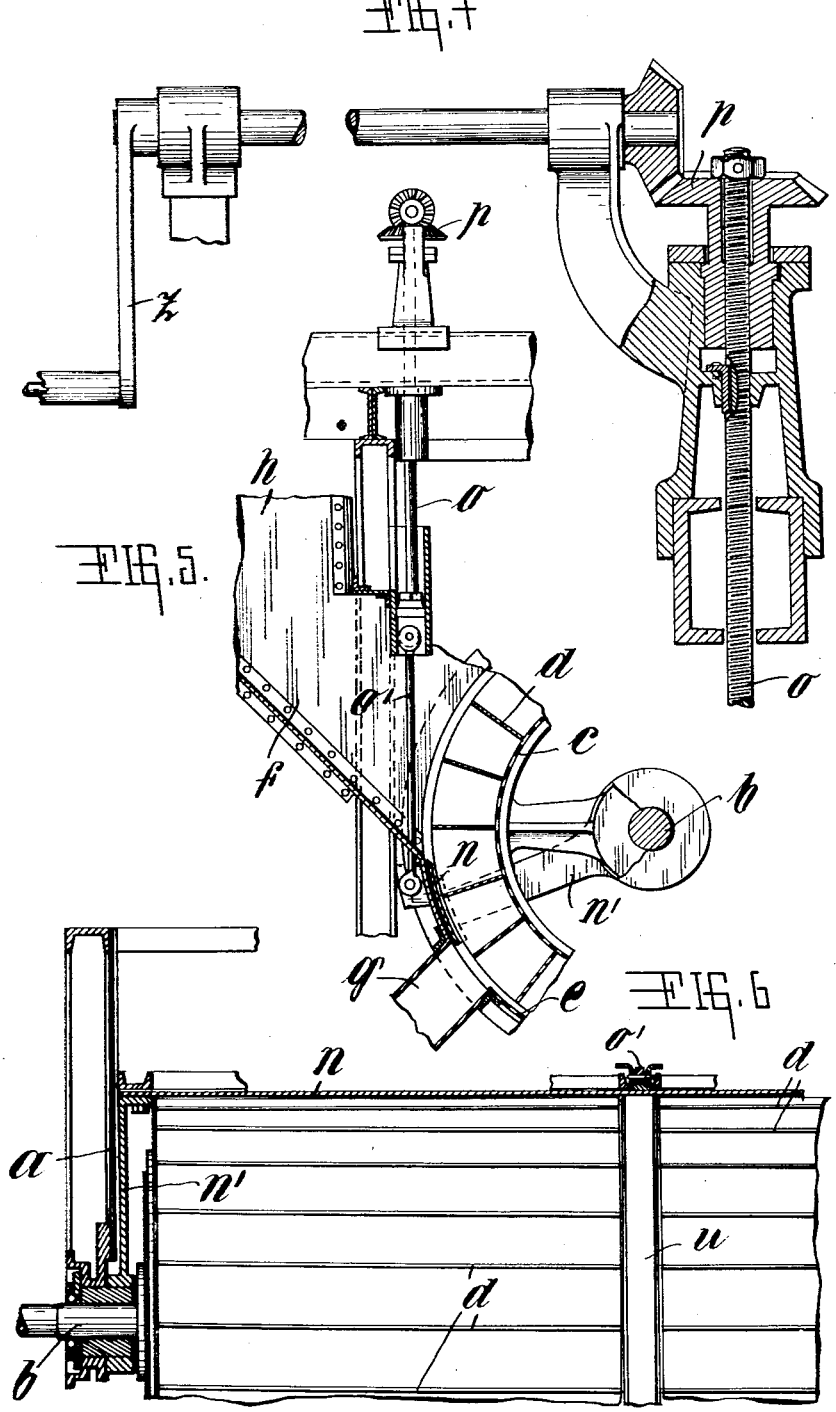

UNITED STATES PATENT OFFICE.

PAUL HEIN, OF ESSEN-RUETTENSCHEID, GERMANY, ASSIGNOR TO DIAMANT BRIKETT-WERKE, G. M. B. H., OF BERLIN, GERMANY.

MEANS FOR HEATING BRIQUETS AND THE LIKE.

1,039,533.   Specification of Letters Patent.   Patented Sept. 24, 1912.

Application filed July 21, 1911. Serial No. 639,862.

*To all whom it may concern:*

Be it known that I, PAUL HEIN, a subject of the King of Prussia, residing at Essen-Ruettenscheid, in the Kingdom of Prussia, German Empire, have invented certain new and useful Improvements in Means for Heating Briquets and the Like, of which the following is a specification.

The present invention has for its object an apparatus for hardening, coking, roasting or drying materials of any kind, such as briquets, potatoes or the like. The apparatus is, however, mainly intended for briquets of the kind that have been compressed, with the addition of a binding medium preferably soluble in water, from small coke or coal and which require treatment to cause the coking of the binding medium so that the latter may become impervious to water. The apparatus can also be utilized in an equally advantageous manner for drying and treating any other kinds of material.

The object of my invention is to subject the material to be coked or roasted on all sides to the direct action of hot roasting gases gradually and as completely as possible.

My new apparatus insures a reliable continuous and industrially efficient operation because of its peculiar construction and operation.

One form of my apparatus for coking briquets or the like is illustrated, by way of example, in the accompanying drawings in which:

Figures 1 and 1ª represent transverse sections of the drums intended for the reception of the material to be treated which drums are arranged in a closed chamber. Figs. 2 and 2ª represent vertical sections through the roasting or drying oven on the line A—A in Figs. 1 and 1ª. Fig. 3 shows the roasting drums in section on the plane of the axes of the drums. Fig. 4 is a cross section of the roasting drums on the line D—D in Fig. 3. Figs. 5, 6 and 7 illustrate a closing slide for the drums and its operating gear.

Broadly, the method of roasting the material in my apparatus is as follows: The molded briquets are continuously rotated and turned over in a number of drums arranged in superposition, that is in a vertical tier or series which drums are heated by means of hot air, furnace gases or the like.

The gases pass through the perforated walls of the drums and flow over the briquets. With this object in view, my roasting apparatus consists in a closed casing *a* composed of some suitable material, such as brickwork, sheet metal or the like, in which the drums *c* are rotatably mounted on driving shafts *b*, three such drums being shown. The drums *c* have a perforated periphery and radially directed walls *d* (Fig. 4) arranged at an interval one from the other so that they form scoop-like compartments or chambers for the reception of the briquets to be treated. In order to carry out the roasting process with as few roasting drums as possible or, in the alternative, to utilize the roasting drums to the maximum extent guide walls *e* which adapt themselves to the outer edges of the partitions *d* extend over a portion of the periphery of the drums *c*. In order to afford a free passage for the ascending hot air these guide walls *e* are also perforated; they prevent the briquets from falling prematurely out of the several compartments of the drums so that they can be conveyed through almost a complete revolution of the drums. The drums can be made of any convenient length and they can be divided into two or more compartments. The walls of the drums can also be supported by supporting arms mounted on the shaft *b*. In order to prevent deformation of the drums by the heat especially when they are of exceptionally large size suitable supporting members, such as wheels, rollers or the like can be provided. Any suitable number of these supporting members can be utilized and they are preferably arranged outside and underneath the drums. In the construction here illustrated rotatably mounted disks *t* have been utilized for this purpose (Figs. 3 and 4); these disks pass through openings in the guide walls *e* and bear against the drums. In order to provide a good bearing for the supporting disks *t* the drums are furnished with special bearing rings *u* which extend over the walls *d*. These bearing rings rest on rings which are supported by the supporting arms of the drums. As the drums *c* are provided with guide walls *e* on their lower side a separate inlet and outlet for the material can be arranged for each drum and all the inlets and outlets can be located on the same side of the apparatus, and this is a very important feature of my invention. In the drawing (Figs. 1 and 1ª) the inlets to the drums or the inlet chutes have been marked $f$ $f'$ $f^2$, while the outlet chutes have been marked $g$ $g'$ $g^2$.

In accordance with my invention the material to be roasted or the like is conducted in a continuous path through the apparatus from the highest drum to the next lower drum and so forth until finally it leaves the apparatus completely roasted. This result is attained in an exceedingly simple manner by suitably connecting the outlet of each drum with the inlet of the next lower drum.

Experience has demonstrated that notwithstanding the greatest care the briquets conducted through a kiln become easily kindled during the roasting operation. This is not only a frequent cause of interruption in the operation of the apparatus, but the heat resulting from the burning of the briquets endangers the entire apparatus.

A further object of my invention therefore is to reduce this danger to the minimum, or eliminate it altogether. This result is obtained in a simple manner.

According to my invention the inlets and outlets for the material are located on the same side of the apparatus and are connected by means of a discharge chute common to all the drums, in such a manner that if a fire should occur, the material contained in all the drums can simultaneously be discharged from the apparatus in a single operation. This chute which is carried to a suitable place for depositing the briquets is marked $h$ in the drawing (Figs. 1 and 1ª). All the inlets and outlets of the several drums $c$ open into this chute $h$ with the exception of the inlet of the topmost drum and the outlet of the lowest drum. This discharge chute $h$ comprises a reversing member for each drum preferably a pivoted flap $h'$ (Figs. 1 and 1ª) in such a manner that in the reverse position of this flap $h'$ the briquets passing from the chute $f$ $f'f^2$ into the chute $h$ fall onto this flap by which they are conducted into the chutes $g$, $g'$ $g^2$ of the next lower drum. In this manner the continuous circulation of the material under treatment through all the drums is insured. By swinging the flaps $h'$ into the positions illustrated in broken lines they are caused to close the inlet chutes of the drums. The briquets passing from the drums into the chute $h$ are then unable to enter the next drum but are conducted directly through the chute $h$ and out of the apparatus. It is advantageous to make this discharge chute $h$ which connects with the inlet and outlet chutes for the several drums of the same width as that of these inlet and outlet chutes. In order to bring into as small a compass as possible the briquets which are introduced into the discharge chute from the outlet chute of the drum in a wide line, a number of guide or baffle plates $i$ may be provided in the delivery chute in a more or less inclined position. The flaps $h$ can be operated by hand or in any other convenient manner. To this end some convenient means may be provided outside the chute so that if desired all the flaps can be reversed together from a single station.

Any equivalent means, such as slides or the like can of course be employed instead of the flaps referred to above.

The material to be roasted is supplied to a receptacle $k$ of suitable size which communicates at its lower end with the inlet chute $f$ of the top drum $c$. The material is supplied at a suitable rate from the reservoir $k$ through the inlet $f$ to the drum $c$, any material supplied to the reservoir $k$ in excess of this rate being stored therein. An overflow passage $l$ serves for discharging any material supplied in excess stored in the reservoir, the said excess being thus returned to the main or original storage place. This overflow passage may be of any convenient construction and communicate with any appropriate part of the reservoir $k$ or this passage can be replaced by a chute or some other device serving the same purpose.

It is not only desirable but absolutely necessary to provide means for regulating the supply of the material to be treated from the reservoir $k$ through the inlet chute $f$ to the drum $c$ and also from one drum to another. To this end a cut-off slide $n$ is provided between the drum $c$ and the wall of the oven and is secured on each side of the drum by means of an arm $n'$. These arms are suitably mounted on the shaft of the roasting drums in such a manner that the cut-off slide $n$ is able to move over a portion of the periphery of the drum. The arrangement is such that during the operation of the apparatus the slide presents no impediment to the passage of the material to and from the drums. The most convenient position for arranging the slides is between the inlet and the outlet chutes. In this position the slide can at once be brought in front of the inlet or in front of the outlet whereby the supply of the material or its discharge can be wholly or partially cut off or regulated in any convenient manner, by operating the arms $n'$ and thereby the slides $n$. In the apparatus as shown the slide $n$ is adjusted upward and downward by means of a handle $z$ fitted to a shaft on which a bevel gear wheel is mounted. Another bevel gear $p$ meshes therewith, the hub of which is formed as a nut, and which is rotatably mounted in a suitably formed bearing (Fig. 7). A spindle $o$ is guided in this nut-gear wheel; this spindle is threaded and, by means of a cross head, it is connected with a crank rod $b'$. Preferably this connecting rod is jointed directly to the slide. By rotating the handle $z$ in one direction or the other, by the intermediary of the bevel gears $p$ and of the spindle $o$ the slide $n$ is brought either into its closed or its opened position. With this arrangement the slide will be securely held in any position that has been given to it without the need of any locking means.

When the briquets have been supplied to the receptacle $k$ they pass through the inlet $f$ into the compartments of the top drum $c$. On their way through the drums the briquets are subjected continuously and on all sides to the direct action of the hot gases. The hot air or gases are supplied at the bottom of the apparatus through the inlet $a'$ (Fig. 1$^a$) and they pass upwardly through the perforated walls of the drums $c$ and flow over the briquets. At the top of the apparatus the hot air or gases escape through the flue $m$ (Fig. 1). From the last drum the briquets pass directly into the hopper-shaped receptacle $s$, thence into the air lock $r$ and finally out of the apparatus. In case the briquets should become overheated and take fire in the air lock, another discharge passage $s^2$ is provided; this discharge is rendered operative when desired by means of the actuating member $s'$.

The coal dust formed during the passage of the briquets through the apparatus is collected in the receptacle $q$ arranged below the inlet $a'$ and provided with a discharge pipe $q'$.

In order to be able to ascertain the condition of the charge contained in the apparatus, a door $v$ is provided in the receptacle $k$, the position of this door being shown on an indicator $Y'$ by means of an index $y^2$ operated through a lever $w$ and traction member $x$. The free end of lever $w$ is provided with a counter-weight $w'$.

What I claim as my invention is:

1. Apparatus for drying, roasting or coking briquets, and the like, comprising a plurality of superposed rotary drums having perforated walls and peripherical compartments adapted to receive the material to be treated, and a common chute, both for conveying the material from a higher drum to the next lower drum and for discharging the material from any and all of the drums at will.

2. Apparatus for drying, roasting and coking briquets and the like, comprising a plurality of superposed rotary drums having perforated walls and peripherical compartments, adapted to receive the material to be treated, a chute both for conveying the material from a higher drum to the next lower drum and for discharging the material from any and all of the drums at will, and traps for establishing communication between a drum and either the said chute or with the inlet of the next lower drum.

3. Apparatus for drying, roasting and coking briquets and the like, comprising a plurality of superposed rotary drums having perforated walls and peripherical compartments adapted to receive the material to be treated, a chute both for conveying the material from a higher drum to the next lower drum and for discharging the material from any and all of the drums at will, traps for establishing communication between a drum and either the said chute or the inlet of the next drum, and guide plates located in said chute below the said traps.

4. Apparatus for drying, roasting and coking briquets and the like, comprising a plurality of superposed rotary drums having perforated walls and peripherical compartments adapted to receive the material to be treated, a guide wall extending over part of the periphery of each drum, and a single chute both for conveying the material from a higher drum to the next lower drum and for discharging the material from any and all of the drums at will.

5. Apparatus for drying, roasting and coking briquets and the like, comprising a plurality of superposed rotary drums having perforated walls and peripherical compartments adapted to receive the material to be treated, a single chute both for conveying the briquets from a higher drum to the next lower drum and for discharging the material from any and all of the compartments at will, and rollers for supporting each drum.

6. Apparatus for drying, roasting and coking briquets and the like, comprising a plurality of superposed rotary drums having perforated walls and peripherical compartments adapted to receive the material to be treated, a single chute both for conveying the material from a higher drum to the next lower drum and for discharging the material from any and all of the drums at will, and a cut-off slide in connection with each drum.

7. Apparatus for drying, roasting and coking briquets and the like, comprising a plurality of superposed rotary drums having perforated walls, peripherical compartments adapted to receive the material to be treated, a chute both for conveying the material from a higher drum to the next lower drum and for discharging the material from any and all of the drums at will, and a supply receptacle connected with the top drum.

8. Apparatus for drying, roasting and coking briquets and the like, comprising a plurality of superposed rotary drums having perforated walls and peripherical compartments adapted to receive the material to be treated, a chute both for conveying the material from a higher drum to the next lower drum and for discharging the material from any and all of the drums at will, a supply receptacle connected with the top drum, and an overflow passage in said receptacle.

9. Apparatus for drying, roasting and coking briquets and the like, comprising a plurality of superposed rotary drums having perforated walls and peripherical compartments adapted to receive the material to be treated, a single chute both for conveying the material from a higher drum to the next lower drum and for discharging the material from any and all of the drums at will, a plurality of discharge passages at the bottom of said chute, and means for rendering said passages alternately operative.

10. Apparatus for drying, roasting and coking briquets and the like, comprising a plurality of superposed rotary drums having perforated walls and peripherical compartments adapted to receive the material to be treated, a chute both for conveying the material from a higher drum to the next lower dum and for discharging the material from any and all of the drums at will, and a hopper at the bottom of the apparatus for receiving and carrying all the dust particles, and a discharge pipe connected with said hopper.

11. Apparatus for drying, roasting and coking briquets and the like, comprising a plurality of superposed rotary drums having perforated walls and peripherical compartments adapted to receive the material to be treated, a chute both for conveying the material from a higher drum to the next lower drum and for discharging the material from any and all of the drums at will, a cut-off slide and an operating shaft therefor, an actuating shaft and gears on said shafts in mesh with each other.

In testimony whereof I have affixed my signature in presence of two witnesses.

PAUL HEIN.

Witnesses:
  WOLDEMAR HAUPT,
  HENRY HASPER.